United States Patent [19]

Aoki

[11] Patent Number: 4,571,352

[45] Date of Patent: Feb. 18, 1986

[54] METHOD FOR COATING ALUMINUM METAL BODY WITH ALUMINUM ALLOY BRAZING FILLER METAL

[75] Inventor: Hisao Aoki, Gunma, Japan

[73] Assignee: Sanden Corporation, Gunma, Japan

[21] Appl. No.: 691,922

[22] Filed: Jan. 16, 1985

[51] Int. Cl.[4] ............................................. B05D 1/18
[52] U.S. Cl. ..................................... 427/431; 427/311
[58] Field of Search ................................ 427/431, 311

[56] References Cited

U.S. PATENT DOCUMENTS 2,569,097 9/1951 Grange ................................ 427/311

Primary Examiner—James R. Hoffman
Attorney, Agent, or Firm—Hopgood, Calimafde, Kalil, Blaustein & Judlowe

[57] ABSTRACT

Aluminum metal piece is dipped into a molten aluminum alloy brazing filler metal covered with a flux layer melted by heat of the molten filler metal, and thereafter is taken out therefrom. Thus, the aluminum metal piece is readily coated with a double coating film of the aluminum alloy brazing filler metal and the flux coating film.

4 Claims, 2 Drawing Figures

METHOD FOR COATING ALUMINUM METAL BODY WITH ALUMINUM ALLOY BRAZING FILLER METAL

BACKGROUND OF THE INVENTION

1. Field of the Invention

The present invention relates to joining of aluminum metal bodies to each other, and in particular, to coating of one of those aluminum metal bodies to be joined to one another with aluminum alloy brazing filler metal.

2. Description of the Prior Art

In assembling of a product having a plurality of aluminum metal bodies, elements or parts, those aluminum metal parts are often connected or joined to one another by brazing.

In production of, for example, a serpentine type refrigerant evaporator as disclosed in U.S. Pat. Nos. 4,350,025 and 4,353,224, corrugated fin units and an inlet and an outlet header pipes are fixedly joined to a serpentine-anfractuous flat metal tube.

The corrugated fin units, the flat tube, and the header pipes are usually made of aluminum alloys. For example, the flat tube is made of an aluminum alloy AA (Aluminum Association in U.S.A.) 1050. Since aluminum alloy brazing filler metal is necessary to join aluminum metal parts to each other, each fin unit is usually made of an aluminum brazing sheet which has a core metal of, for example, AA 3003 with a cladding of an aluminum alloy brazing filler metal such as AA 4343, 4045, or 4047. Each header pipe is also made of a similar aluminum brazing sheet by the use of an electric resistance welding tube mill.

The fin units, flat tube and header pipes are preassembled, and are heated in a brazing furnace to a brazing temperature of about 600° C. Then, the filler metals on surfaces of the fin units and header pipes melt and flow so that the fin units and header pipes are joined to the flat tube by brazing.

An aluminum brazing sheet is usually made by putting a core aluminum metal piece between two pieces of the filler metal and rolling them together.

The aluminum brazing sheet is hard because the filler metal has a comparatively high hardness, and therefore bending of the brazing sheet is not so easy but difficult. Therefore, it is not easy to form the corrugated fin units and the header pipes from aluminum brazing sheets. This is a factor of the high cost of the evaporator, in addition to another factor that the aluminum brazing sheet per se is expensive.

SUMMARY OF THE INVENTION

It is an object of the present invention to provide a method for readily coating an aluminum metal body with an aluminum alloy brazing filler metal.

It is another object of the present invention to provide a method for forming a coating of the aluminum alloy brazing filler metal on a surface of an aluminum metal body with a flux layer being automatically applied onto the casing.

According to the present invention, the aluminum alloy brazing filler metal is melted in an open-topped melting tank. Flux, which is usually used in the conventional aluminum brazing, is floated on the surface of the molten filler metal. An aluminum metal body is dipped into the molten filler metal through the floated flux layer, and thereafter, is taken out of the tank. Whereby, the surface of the aluminum body is coated with the filler metal and the flux together.

The flux comprises a mixture of fluoaluminate complexes of $K_3AlF_6$ and $KAlF_4$ corresponding to an $AlF_3/KF$ ratio between 65/35 and 45/55, preferably between 60/40 and 50/50, in parts by weight.

Further object, features, and other aspects of the present invention will be understood from the following detailed description of preferred embodiments of the present invention referring to the accompanying drawing.

DETAILED DESCRIPTION OF PREFERRED EMBODIMENTS

According to the present invention, at first an aluminum alloy brazing filler metal and a flux are melted in a melting tank.

Figure 1:
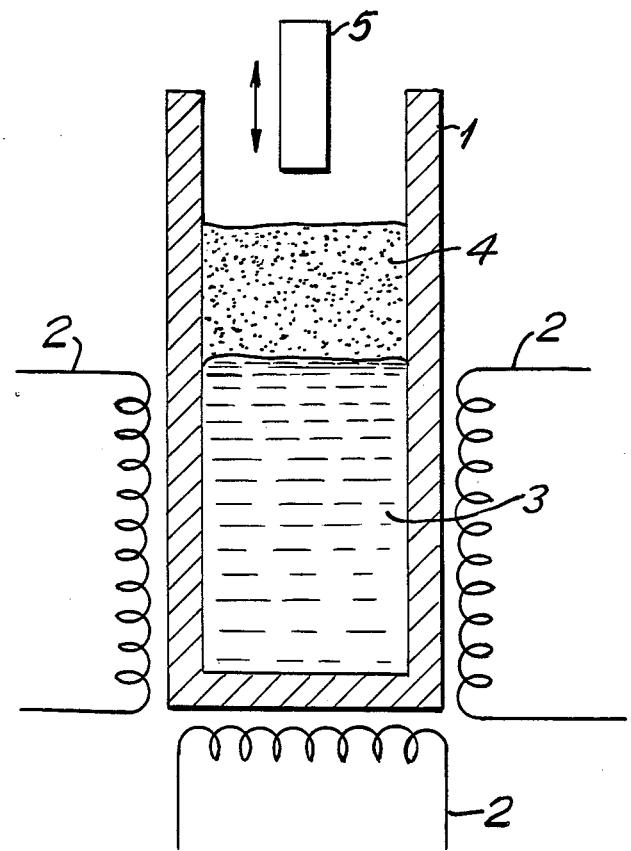
FIG. 1 is a sectional view of a melting tank in which the aluminum alloy brazing filler metal and the flux are melted.

Referring to FIG. 1, a melting tank comprises an opentopped refractory tank 1 and electric heaters 2. In tank 1, an aluminum alloy brazing filler metal 3, such as AA 4343, AA 4045, AA 4047 or the like, is melted at about 630° C. by electric heaters.

In this connection, AA 4343 comprises, by weight, 0.25% or less Cu, 6.8–8.2% Si, 0.8% or less Fe, 0.10% or less Mn, 0.20% or less Zn, and the balance substantially Al, and has a brazing temperature of about 600°–620° C. and a liquidus temperature of about 615° C. AA 4045 comprises, by weight, 0.30% or less Cu, 9.0–11.0% Si, 0.8% or less Fe, 0.05% or less Mn, 0.05% or less Mg, 0.10% or less Zn, 0.20% or less Ti, and the balance substantially Al, and has a brazing temperature of about 590°–605° C. and a liguidus temperature of about 590° C. AA 4047 comprises, by weight, 0.30% or less Cu, 11.0–13.0% Si, 0.8% or less Fe, 0.15% or less Mn, 0.10% or less Mg, 0.20% or less Zn, and the balance substantially Al, and has a brazing temperature of about 580°–605° C. and a liquidus temperature of about 580° C.

A flux 4 is floated on the molten filler metal 3.

As the flux, a powdery mixture of potassium fluoaluminate complexes of $K_3AlF_6$ and $KAlF_4$ is used, which is disclosed in U.S. Pat. Nos. 3,951,328 and 3,971,501. A ratio of $AlF_3/KF$ of the flux is between 65/35 and 45/55 in parts by weight, preferably between 60/40 and 50/50.

Since a melting point of the flux is lower than 600° C., the flux 4 is melted by heat of the molten filler metal 3.

Preferably, flux layer 4 is not entirely melted but its surface layer is maintained in a non-melted condition. Such a condition can be obtained by increasing the amount of the flux deposited on the molten filler metal.

An aluminum alloy piece, such as a pipe 5 of, for example, AA 1050 (which comprises, by weight, 0.25% or less Si, 0.40% or less Fe, 0.05% or less Cu, 0.05% or less Mn, 0.05% or less Mg, 0.05% or less Zn, 0.03% or less Ti and 99.50% or more Al) or AA 3003 (which comprises, by weight, 0.6% or less Si, 0.7% or less Fe, 0.05–0.20% Cu, 1.0–1.5% Mn, 0.10% or less Zn and the balance Al) is inserted into the molten filler 3 through flux layer 4. In that case, at first the flux adheres onto the surface of pipe 5 and cured thereon because pipe 5 is cold or at room temperature. Then, when the pipe goes into the molten filler metal 3, the flux cured on the pipe is again melted by heat of the molten filler metal. The flux becomes reactive and decomposes a surface oxide film on the pipe, so that the molten filler metal adheres onto the surface of the pipe.

Thereafter, the pipe is taken out of tank 1. At that time, the pipe again passes through the flux layer 4. Accordingly, the flux adheres onto a thin coating film of the filler metal adhering onto the surface of the pipe.

Figure 2:
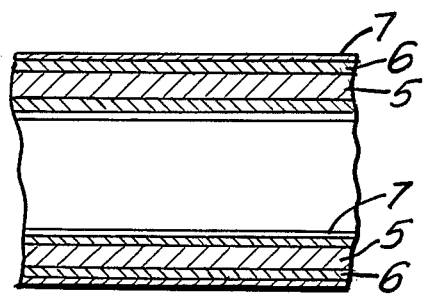
FIG. 2 is a sectional view of an aluminum pipe as coated with the filler metal and the flux.

Thus, the pipe 5 is coated by an aluminum alloy brazing filler metal layer 6 and a flux layer 7, as shown in FIG. 2.

In an example, a pipe of AA 3003 was dipped into the molten filler metal 3 for 5 seconds and then, taken out from the tank. The pipe was coated with the filler metal and the flux. The pipe was put on a plate AA 1050 and was heated at 600° C. within $N_2$ atmosphere. The pipe was firmly brazed and joined to the plate.

According to the present invention, after aluminum metal body or piece is worked to a desired shape, it is coated with an aluminum alloy brazing filler metal. Therefore, use of an expensive aluminum brazing sheet of a low workability can be avoided in assembling devices of aluminum metal parts.

Furthermore, since the aluminum alloy brazing filler metal coating is coated by a flux coating, the brazing operation is simplified. Since the flux coating is non-corrosive, aluminum metal parts treated by the present invention can be stored for a long time.

What is claimed is:
1. A method for coating an aluminum metal body with aluminum alloy brazing filler metal which comprises:
   preparing a molten aluminum alloy brazing filler metal in a melting tank, with a flux being melted on the upper surface of said molten aluminum alloy brazing filler metal;
   inserting said aluminum metal body into said molten aluminum alloy brazing filler metal through said molten flux layer; and
   taking said aluminum metal body out of said molten aluminum alloy brazing filler metal through said molten flux layer, whereby said aluminum metal body being coated with said aluminum alloy brazing filler metal and said flux.
2. A method as claimed in claim 1, wherein said flux comprises a mixture of potassium fluoaluminate complexes of $K_3AlF_6$ and $KAlF_4$ corresponding to an $AlF_3/KF$ ratio between 65/35 and 45/55 in parts by weight.
3. A method as claimed in claim 2, wherein said $AlF_3/KF$ ratio is between 60/40 and 50/50 in parts by weight.
4. A method as claimed in claim 1, wherein said flux layer on said molten aluminum alloy brazing filler metal is maintained in an upper surface layer thereof, with the remaining parts below said upper surface layer of said flux layer being melted.

* * * * *